United States Patent [19]

Blum et al.

[11] Patent Number: 5,569,707
[45] Date of Patent: Oct. 29, 1996

[54] AQUEOUS POLYESTER-POLYURETHANE DISPERSIONS AND THEIR USE IN COATING COMPOSITIONS

[75] Inventors: Harald Blum, Wachtendonk; Joachim Petzoldt, Monheim, both of Germany

[73] Assignee: Bayer Aktiengesellschaft, Leverkusen, Germany

[21] Appl. No.: 594,742

[22] Filed: Jan. 31, 1996

Related U.S. Application Data

[63] Continuation of Ser. No. 390,188, Feb. 17, 1995, abandoned.

[30] Foreign Application Priority Data

Feb. 25, 1994 [DE] Germany ................ 44 06 159.5

[51] Int. Cl.[6] .................. C08J 3/00; C08K 3/20; C08L 75/00
[52] U.S. Cl. .................. 524/591; 524/539; 524/839; 524/840
[58] Field of Search .................. 524/591, 539, 524/839, 840

[56] References Cited

U.S. PATENT DOCUMENTS

| | | | |
|---|---|---|---|
| 5,126,393 | 6/1992 | Blum et al. | 524/538 |
| 5,194,487 | 3/1993 | Jacobs | 524/591 |
| 5,227,422 | 7/1993 | Mitsuji et al. | 524/457 |
| 5,349,041 | 9/1994 | Blum et al. | 528/85 |
| 5,354,397 | 10/1994 | Miyake et al. | 156/77 |
| 5,387,642 | 2/1995 | Blum et al. | 524/591 |
| 5,389,718 | 2/1995 | Potter et al. | 524/591 |

FOREIGN PATENT DOCUMENTS

| | | | |
|---|---|---|---|
| 140323 | 5/1985 | European Pat. Off. | |
| 63-132919 | 6/1988 | Japan | |

*Primary Examiner*—Paul R. Michl
*Assistant Examiner*—Patrick Niland
*Attorney, Agent, or Firm*—Joseph C. Gil; Thomas W. Roy

[57] ABSTRACT

The present invention relates to aqueous dispersions of polyester-polyurethanes which contain hydroxyl groups and are prepared from a) 15 to 90% by weight of one or more essentially linear, polyester polyols, b) 4 to 75% by weight of one or more essentially difunctional polyols selected from i) polycarbonates, ii) polyether polyols and iii) polyester polyols which are obtained by the hydrogenation of carboxyl groups to hydroxyl groups, the alkoxylation of carboxyl groups or the esterification of carboxyl groups using low molecular weight diols of dimeric fatty acids, c) 1 to 10% by weight of one or more components containing acid groups selected from i) hydroxycarboxylic acids, ii) amino acids, iii) aminosulphonic acids and iv) alkali salts of the acids of i), ii) and iii), d) 0 to 20% by weight of a low molecular weight component containing at least two hydroxyl and/or amino groups, e) 0 to 20% by weight of one or more hydrophilic monovalent or divalent alcohols and f) 5 to 50% by weight of a polyisocyanate component containing at least 50% by weight of linear aliphatic diisocyanates having a molecular weight of 168 to 300, wherein the sum of the percentages of components a) to f) is 100. The present invention also relates to aqueous coating compositions containing as these polyester-polyurethanes as a binder component.

12 Claims, No Drawings

AQUEOUS POLYESTER-POLYURETHANE DISPERSIONS AND THEIR USE IN COATING COMPOSITIONS

This application is a continuation of application Ser. No. 08/390,188, filed Feb. 17, 1995, abandoned.

BACKGROUND OF THE INVENTION

1. Field of the Invention

The present invention relates to new aqueous dispersions of polyester-polyurethanes, their use as binder components in coating compositions and soft feel coatings prepared from these coating compositions.

2. Description of the Prior Art

Current aqueous binders can replace binders dissolved in organic solvents in many applications. This applies above all to areas, such as electrophoretic enamelling, wherein aqueous binders can have definite advantages.

For applications having very special requirements, such as the enamelling or coating of plastics using soft feel coatings, the presently available aqueous binders have not been able to meet the necessary requirements.

The properties provided by organic solvent-based polyurethane soft feel coatings (for example, PCT Application WO 92 15 636 or Japanese Patent Application 279 620 dated Nov. 11, 1986 having the publication number J63132-919-A), particularly as regards the soft feel effect, the resistance to solvents, the film mechanics and the bonding to the substrate, has not yet been achieved by aqueous systems. In particular, a coating possessing a good soft feel effect combined with a satisfactory resistance to solvents has not been possible using aqueous products.

An object of the present invention is to provide aqueous binders which are suitable for use in flexible lacquer, coating and sealing compositions, in particular for the production of soft feel coatings, and which combine a good soft feel effect, good film mechanics and surface bonding, and acceptable resistance to solvents. It is an additional object of the present invention for these compositions to contain as few volatile organic substances as possible, so that they are capable of satisfying environmental requirements.

These objects may be achieved with the aqueous polyester-polyurethane dispersions and coating compositions described in more detail below.

SUMMARY OF THE INVENTION

The present invention relates to aqueous dispersions of polyester-polyurethanes having an acid number of 5 to 60 mg KOH/g, a hydroxyl group content of 0.25 to 6.5% by weight and a urethane group content (calculated as —NH—CO—O—) of 2 to 25% by weight, wherein these ranges are based on polyester-polyurethane solids and wherein the polyester-polyurethanes are reaction products, optionally at least partly neutralized by bases, of a) 15 to 90% by weight of one or more essentially linear, polyester polyols having a molecular weight of 500 to 4000, other than those which satisfy the requirements of component b), b) 4 to 75% by weight of one or more essentially difunctional polyols selected from i) polycarbonates having a molecular weight of 400 to 6000, ii) polyether polyols having a molecular weight of 350 to 3500, which contain less than 30% by weight of ethylene oxide units, based on the total weight of alkylene oxides, present in the form of polyether chains and iii) polyester polyols which contain ester groups and are obtained by the hydrogenation of carboxyl groups to hydroxyl groups, the alkoxylation of carboxyl groups or the esterification of carboxyl groups using low molecular weight diols of dimeric fatty acids, c) 1 to 10% by weight of one or more acidic components selected from i) hydroxycarboxylic acids, ii) amino acids, iii) aminosulphonic acids and iv) alkali salts of the acids of i), ii) and iii), d) 0 to 20% by weight of a low molecular weight component selected from compounds which have a molecular weight of 60 to 300 and contain at least two hydroxyl and/or amino groups, e) 0 to 20% by weight of one or more hydrophilic monovalent or divalent alcohols which have a molecular weight of 350 to 3000 and contain lateral and/or terminal ethylene oxide units and f) 5 to 50% by weight of a polyisocyanate component selected from organic polyisocyanates having a molecular weight of 168 to 1000, provided that at least 50% by weight of the polyisocyanatecomponent is selected from linear aliphatic diisocyanates having a molecular weight of 168 to 300, wherein the sum of the percentages of components a) to f) is 100.

The present invention also relates to aqueous coating compositions containing as binder A) a polyol component containing 25 to 100% by weight of a polyester-polyurethane according to the invention and 0 to 75% by weight of other binders and B) a cross-linking resin selected from amino resins, blocked polyisocyanates which may be hydrophilically modified and polyisocyanates containing free isocyanate groups which may be hydrophilically modified.

Finally, the present invention relates to soft feel coatings prepared from these coating compositions containing the polyester-polyurethanes according to the invention.

DETAILED DESCRIPTION OF THE INVENTION

The polyester-polyurethane dispersions according to the invention have a solids content of 15 to 68, preferably from 33 to 60% by weight; a viscosity of 10 to 20,000, preferably 50 to 5000 mPa.s (determined at 23° C. by means of a rotating viscometer); and a pH value of 5 to 10, preferably 6 to 8 as determined according to DIN 53785 after dilution with distilled water to a solids content of 10% by weight. In accordance with the present invention the term "dispersion" includes aqueous dispersions as well as aqueous solutions. The question as to whether dispersions or solutions are formed depends in particular on the salt group content and on the molecular weight of the polymers.

The polyester-polyurethanes present as the dispersed phase in the dispersions have, based on solids, a urethane group content (—NH—CO—O) of 2 to 25, preferably 4 to 19% by weight, an acid number of 5 to 60, preferably 8 to 40 mg KOH/g (the acid number refers both to free acid groups and to the acid groups neutralized with bases, and a hydroxyl group content of 0.3 to 6.5, preferably 0.5 to 3.5% by weight. The dilutability in water of the polyester-polyurethane is attributable, at least in part, to their content of anionic groups.

The preparation of the dispersions is carried out by reacting 15 to 90, preferably 27 to 70% by weight of starting component a); 4 to 75, preferably 10 to 60% by weight of starting component b); 1 to 10, preferably 2 to 7% by weight of starting component c); 0 to 20, preferably 0.5 to 10% by weight of starting component d); and 0 to 20, preferably 0 to 10% by weight of starting component e) with 5 to 50, preferably 7 to 30% by weight of starting component f), wherein the sum of the percentages of a) to f) is 100.

The reaction may be carried out solvent free or in an organic solution having a solids content of at least 40% by weight, preferably at least 85% by weight, and in the presence of 0 to 2.5, preferably 0.01 to 0.5% by weight of suitable catalysts. Components a), b), c), d) and e) are optionally added to the solvent and reacted at 40° to 160° C. with component f) until virtually no free NCO groups can be detected. The reaction is conducted at an equivalent ratio of isocyanate-reactive groups to isocyanate groups of 1.2:1 to 2.5:1, preferably 1.4:1 to 2.0:1, resulting in products having the previously mentioned hydroxyl group content. In determining this ratio, carboxyl groups optionally present in the reaction mixture which are intended for conversion into anionic groups are not considered to be "isocyanate-reactive groups."

After the reaction, the reaction mixture is dispersed or dissolved in water. 25 to 100, preferably 45 to 100% of the acid groups are converted into salt groups during the reaction or prior to or during the dispersion stage by adding a neutralizing agent. Neutralization is not necessary if salts, in particular alkali salts, of suitable amino acids, hydroxycarboxylic acids or aminosulphonic acids have been used as component c).

Starting components a) are essentially linear polyester polyols having a molecular weight of 500 to 4000, preferably 600 to 2400. The term "essentially linear" means that the compounds have on average at most 0.5, preferably less than 0.3 and more preferably less than 0.1, branch points per molecule, i.e., that the (average) hydroxyl functionality is at most 2.5, preferably less than 2.3 and preferably less than 2.1. The term "essentially difunctional" means that the compounds have on average at most 0.1, preferably no branch points per molecule, i.e., that the average hydroxyl functionality is at most 2.1, preferably 2.0. The molecular weight of the starting components refers to the number average molecular weight, which may be calculated from the hydroxyl group content and the hydroxyl functionality.

The preparation of polyester polyols a) is carried out by the polycondensation of a1) 25 to 75, preferably 30 to 65% by weight of aliphatic dicarboxylic acids or anhydrides thereof having a total of 4 to 50 carbon atoms, preferably aliphatic dicarboxylic acids having a total of 5 to 45 carbon atoms, a2) 15 to 70, preferably 20 to 65% by weight of aliphatic diols having a molecular weight of 62 to 2000, optionally containing ether groups, ester groups and/or carbonate groups, a3) 0 to 30, preferably 0 to 15% by weight of an acid component selected from cycloaliphatic dicarboxylic and/or tricarboxylic acids having a molecular weight of 154 to 198, aromatic dicarboxylic and/or tricarboxylic acids having a molecular weight of 148 to 192, anhydrides of these acids and aliphatic monocarboxylic acids having a molecular weight of 144 to 290, and a4) 0 to 10, preferably 0 to 7% by weight, of trifunctional or higher functional alcohols having a molecular weight of 92 to 200, wherein the sum of the percentages of a1 to a4) is 100. The reaction is optionally carried out with the aid of conventional esterification catalysts, preferably by melt condensation or azeotropic condensation at temperatures of 140° to 240° C.

Examples of suitable acids all and of corresponding anhydrides include maleic acid (anhydride), fumaric acid, succinic acid (anhydride), adipic acid, sebacic acid, azelaic acid, commercially available dimeric fatty acids, and mixtures of such acids and acid anhydrides. The dimeric fatty acids may be used in hydrogenated or non-hydrogenated form and may contain mono-functional, trifunctional and higher functional carboxylic acids. Suitable dimeric fatty acids include Pripol 1008, Pripol 1009, Pripol 1012, Pripol 1013, Pripol 1017, Pripol 1022 and Pripol 1025 (from Unichema).

Preferred components a1) are adipic acid, sebacic acid, azelaic acid and hydrogenated dimeric fatty acids containing less than 5% by weight of monocarboxylic acids and less than 25% by weight of tricarboxylic acids.

Especially preferred are mixtures of adipic acid and the preferred dimeric fatty acids previously set forth, more preferably in an amount of 0.35 to 0.98 equivalents of adipic acid and 0.02 to 0.65 equivalents of dimeric fatty acid, based on the total amount of these components.

Starting component a2) is selected from diols having a molecular weight of 62 to 2000 which optionally contain ether groups, ester groups and/or carbonate groups. Preferred diols include ethylene glycol, 1,2- and 1,3-propanediol, 1,3- and 1,4-butanediol, 1,6-hexanediol, diethylene glycol, dipropylene glycol, neopentyl glycol and mixtures of these diols. Other suitable diols include triethylene glycol, tetraethylene glycol, tripropylene glycol, tetrapropylene glycol, polycarbonate diols having hydroxyl numbers of 56 to 168 (which may be obtained by reacting any of the preceding diols with diphenyl carbonate or phosgene), dimeric fatty alcohols and mixtures of these diols or mixtures of these diols preferred diols.

The term "dimeric fatty alcohol" means diols which can be obtained from technical dimerized fatty acids. Dimerized fatty acids are those containing at least 75% by weight of dimeric acids, i.e., dicarboxylic acids having an average of 30 to 45 carbon atoms per molecule. The conversion of the dimeric fatty acids into dimeric fatty alcohols can be carried out, for example, by reduction of the carboxyl groups to hydroxyl groups, esterification of the carboxyl groups with the previously described low molecular weight diols or by alkoxylation of the carboxyl groups, for example, by means of ethylene oxide and/or propylene oxide. An example of a dimeric fatty alcohol suitable for use as component a2) is Pripol 2033 from Unichema.

Suitable starting components a3) include phthalic acid (anhydride), isophthalic acid, tetrahydrophthalic acid (anhydride), hexahydrophthalic acid (anhydride), 1,4-cyclohexane dicarboxylic acid, trimeric fatty acids, dimeric fatty acids containing high proportions of trimeric fatty acids, 2-ethylhexanoic acid, isononanoic acid, coconut oil acid, hydrogenated technical fatty acids, oleic acid, stearic acid, palmitic acid, soybean oil fatty acid, ricinoleic acid, peanut oil fatty acid, sunflower oil fatty acid and mixtures of these acids. Preferred are phthalic anhydride, isophthalic acid, hexahydrophthalic anhydride, dimeric fatty acids having high proportions of trimeric fatty acids, trimeric fatty acids, hydrogenated technical fatty acids, isononanoic acid and/or 2-ethylhexanoic acid.

Starting component a4) is selected from multivalent alcohols such as glycerol, trimethylolpropane, pentaerythritol and mixtures of such multivalent alcohols. Trimethylolpropane and glycerol and mixtures of these two triols are particularly preferred.

Suitable starting components b) include essentially difunctional polyols selected from (i) polycarbonate diols having a molecular weight of 400 to 6000, (ii) polyether polyols having a molecular weight of 350 to 3500 and (iii) the dimeric fatty alcohols previously described as being suitable for use as starting component a2).

Suitable polycarbonate polyols may be obtained by reacting carbonic acid derivatives such as diphenyl carbonate or phosgene with alcohols, preferably diols. Examples of suitable diols include those described for starting component a2).

Suitable polyether polyols include the ethoxylation and/or propoxylation products of water or the diols described for starting component a2), provided that the ethylene oxide content, based on the total weight of alkylene oxide groups, is less than 30% by weight.

Particularly preferred polyols b) are difunctional polycarbonate polyols having a molecular weight of 750 to 4000.

Starting component c) is selected from the hydroxycarboxylic acids, amino acids, aminosulphonic acids and/or hydroxysulphonic acids described in U.S. Pat. No. 3,479,310, the disclosure of which is herein incorporated by reference. Preferred components c) include 2,2-bis(hydroxymethyl)alkanemonocarboxylic acids having in total 5 to 8 carbon atoms, e.g., those compounds corresponding to the formula

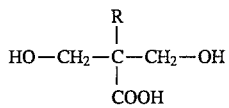

wherein

R represents an alkyl radical having 1 to 4 carbon atoms.

2,2-dimethylolpropionic acid and 2,2-dimethylolbutyric acid are most particularly preferred as component c).

The corresponding alkali salts of the acids of component c) can be used instead of the free acids, provided that the salts are sufficiently compatible with the other structural components.

Starting component d) is selected from compounds which have a molecular weight of 60 to 300 and contain at least two hydroxyl and/or amino groups. Examples include ethylene glycol, propylene glycol, neopentyl glycol, butanediol, hexanediol, cyclohexanedimethanol, diethylene glycol, dipropylene glycol, trimethylolpropane, 1,4-cyclohexanediol, glycerol, pentaerythritol, aminoethanol, aminoisopropanol, N,N'-dimethyl-1,3-diaminopropane and mixtures of other compounds corresponding to the preceding requirements. Low molecular weight reaction products of these compounds with ethylene oxide, propylene oxide and/or ε-caprolactone are also suitable.

Compounds preferred as component d) are low molecular weight diols and triols having a molecular weight of 90 to 150 such as 1,4-butanediol, 1,6-hexanediol, neopentyl glycol, diethylene glycol, glycerol and/or trimethylol-propane.

Starting component e) is selected from nonionic hydrophilic polyethers having one or two hydroxyl groups. These are preferably monovalent or divalent polyether alcohols having a molecular weight of 350 to 2500, which are prepared in a known manner by the alkoxylation of monovalent or divalent alcohols as starter molecules with alkylene oxides such as ethylene oxide or mixtures of ethylene oxide containing up to 40% by weight, based on the total weight of alkylene oxides, of propylene oxide.

Preferred starting components f) are linear aliphatic diisocyanates having a molecular weight of 168 to 300 such as hexamethylene diisocyanate, 1,11-undecane diisocyanate and 1,12-dodecane diisocyanate. Less preferred are mixtures of these linear aliphatic diisocyanates with other diisocyanates such as isophorone diisocyanate, 2,4-diisocyanatotoluene and also the known higher functional lacquer polyisocyanates based on hexamethylene diisocyanate and having a maximum molecular weight of 1000. Starting component f) preferably contains at least 50% by weight of the linear aliphatic diisocyanates described above.

Suitable solvents for preparing polyester-polyurethane dispersions include N-methylpyrrolidone, methoxyhexanone, diethylene glycol dimethyl ether, methyl ethyl ketone, methyl isobutyl ketone, acetone, xylene, toluene, butyl acetate, methoxypropyl acetate and mixtures of these or other solvents. The organic solvents employed may be completely or partly removed from the reaction mixture prior to, during or following the dispersion stage, optionally azeotropically and/or by applying a vacuum or an intensified flow of inert gas.

Suitable catalysts for the urethanization reaction, i.e., the reaction of components a) to e) with component f) include triethylamine, tin (II) octoate, dibutyltin oxide, dibutyltin dilaurate and other conventional catalysts.

Examples of bases suitable for neutralizing the acid groups include ammonia, N-methylmorpholine, triethylamine, dimethylethanolamine, methyldiethanolamine, morpholine, dimethylisopropanol-amine, 2-amino-2-methyl-1-propanol and mixtures of these and other neutralizing agents. Sodium hydroxide, lithium hydroxide and potassium hydroxide are also suitable, but less preferred as neutralizing agents. Ammonia, dimethylethanolamine, methyldiethanolamine and dimethylisopropanolamine are preferred neutralizing agents.

The dispersion stage may be carried out by several methods. For example, the mixture of water and neutralizing agent may be added to the resin, the resin may be added to the mixture of water and neutralizing agent or the mixture of resin and neutralizing agent may be added to the water. "Resin" means either the polyester-polyurethane prepared solvent-free or the solution thereof in one of the solvents named by way of example. The dispersion stage is generally carried out at a temperature of 20 to 100, preferably 40° to 100° C. The dispersibility of the polyester-polyurethane in water can be improved if desired by the use of external emulsifiers during the dispersion.

The polyester-polyurethane dispersions according to the invention generally have an organic solvent content of less than 10, preferably less than 6, and more preferably less than 4% by weight, based on the weight of the dispersion.

In order to obtain specific properties, additional organic solvents can be added to the dispersions following their preparation. Examples include, in particular, alcoholic solvents such as ethanol, n-butanol, n-octanol, butyl diglycol, ethyl diglycol, methyl diglycol or methoxypropanol.

The dispersions according to the invention are aqueous binder components for coating compositions, based on polyhydroxy compounds and cross-linking resins dispersed in water. The dispersions according to the invention may be used as the only binders or mixed with aqueous dispersions of other binders. The polyol component of the coating compositions according to the invention accordingly contains 25 to 100% by weight, based on solids, of the polyester-polyurethanes according to the invention and 0 to 75% by weight of other binders which are dispersible or soluble in water.

Suitable other binders include the known polyester resins, polyacrylic resins or polyurethane resins, which are dispersible in water and optionally contain hydroxyl groups. These other binder components differ from the polyester-polyurethanes according to the invention with regard to their chemical composition.

Preferred other binders are the polyurethane dispersions described in DE-OS 2,651,506 (U.S. Pat. No. 4,237,264, herein incorporated by reference). The polyurethane resins preferably contain no hydroxyl gr ups, are linear and have a number average molecular weight of at least 15,000, calculated from the stoichiometry of the starting materials employed for their preparation. They are anionically and/or nonionically-hydrophilically modified. Preferably component A) contains 25 to 80% by weight, based on solids, of the polyester polyurethanes according to the invention and 20 to 75% by weight, based on solids, of the preferred polyurethanes.

Suitable cross-linking agents B) include amino resins, blocked polyisocyanates which may be hydrophilically modified and polyisocyanates which have free isocyanate groups and may be hydrophilically modified.

Suitable amino resins include water-dilutable or water-dispersible melamine-formaldehyde or urea-formaldehyde condensation products, such as those described in D. H. Solomon, The Chemistry of Organic Filmformers, page 235 ff., John Wiley & Sons Inc., New York, 1967. The melamine resins may be substituted completely or partly by other cross-linking aminoplastics such as those described in "Methoden der organischen Chemie" (Houben-Weyl), Vol. 14/2, Part 2, 4th edition, Georg Thieme Verlag, Stuttgart 1963, page 319 ff.

Suitable blocked polyisocyanates include those based on isophorone diisocyanate, hexamethylene diisocyanate, 1,4-diisocyanatocyclohexane, dicyclohexylmethane diisocyanate, 1,3-diisocyanatobenzene, 1,4-diisocyanatobenzene, 2,4-diisocyanato-1-methylbenzene, 1,3-diisocyanato-2-methylbenzene, 1,3-bis-isocyanato-methylbenzene, 2,4-bis-isocyanato- 1,5 -dimethylbenzene, bis(4-isocyanatophenyl)propane, tris(4-isocyanatophenyl)methane and trimethyl-1,6-diisocyanatohexane. Also suitable are blocked "lacquer polyisocyanates" such as polyisocyanates containing biuret groups and based on 1,6-diisocyanatohexane, polyisocyanates containing isocyanurate groups and based on 1,6-diisocyanatohexane and polyisocyanates containing urethane groups and prepared by reacting 2,4- and/or 2,6-diisocyanatotoluene or isophorone diisocyanate with low molecular weight polyhydroxy compounds such as trimethylolpropane, the isomeric propanediols or butanediols or mixtures thereof.

Blocked polyisocyanates rendered hydrophilic by the incorporation of salt groups or hydrophilic polyether units are also suitable.

Suitable blocking agents for the said polyisocyanates include monovalent alcohols such as methanol, ethanol, butanol, hexanol and benzyl alcohol; oximes such as methyl ethyl ketoxime; lactams such as ε-caprolactam; phenols; or CH acidic compounds such as diethyl malonate.

Suitable polyisocyanate cross-linking agents B) containing free isocyanate groups include organic polyisocyanates which contain aliphatically, cycloaliphatically, araliphatically and/or aromatically bound, free isocyanate groups and are liquid at room temperature. These polyisocyanate cross-linking agents B) generally have a viscosity at 23° C. of 50 to 10,000, preferably 50 to 1500 mPa.s. If necessary, the polyisocyanates may be used mixed with small quantities of inert solvents in order to lower the viscosity to a value within these ranges.

"Lacquer polyisocyanates" based on hexamethylene diisocyanate or 1-isocyanato-3,3,5-trimethyl-5-isocyanatomethylcyclohexane (IPDI) and/or dicyclohexylmethane diisocyanate are very suitable. "Lacquer polyisocyanates" based on these diisocyanates include the known derivatives of these diisocyanates containing biuret groups, urethane groups, uretdione groups and/or isocyanurate groups. Following their preparation, these derivatives are generally treated to remove excess starting diisocyanate, preferably by distillation, to a final content of less than 0.5% by weight.

Preferred aliphatic polyisocyanates to be used according to the present invention include polyisocyanates based on hexamethylene diisocyanate and containing biuret groups. These polyisocyanates may be obtained by the methods disclosed in the U.S. Pat. Nos. 3,124,605, 3,338,010, 3,903, 126, 3,903,127 or 3,976,622 and contain mixtures of N,N', N"-tris-(6-isocyanatohexyl)-biuret mixed with lesser amounts of the higher homologues thereof. Also preferred are the cyclic trimers of hexamethylene diisocyanate which may be obtained in accordance with U.S. Pat. No. 4,324,879 and which contain N,N',N"-tris(6-isocyanatohexyl)isocyanurate mixed with lesser amounts of the higher homologues thereof.

The aromatic polyisocyanates according to the invention which are also suitable, but less preferred, include in particular the "lacquer polyisocyanates" based on 2,4-diiocyanatotoluene or mixtures thereof with 2,6 -diisocyanatotoluene, or based on 4,4'-diisocyanato-diphenylmethane or mixtures thereof with its isomers and/or higher homologues.

Also suitable as polyisocyanate cross-linking agents are polyisocyanates which have been rendered hydrophilic by the incorporation of polyether groups or salt groups and are described, for example, in DE-OS 4,136,618 or U.S. Pat. No. 4,663,377 (herein incorporated by reference).

The previously described polyisocyanate cross-linking agents containing free isocyanate groups are preferred cross-linking resins, particularly those which have been rendered hydrophilic. Particularly preferred as component B) are polyisocyanates or polyisocyanate mixtures exclusively containing aliphatically and/or cycloaliphatically bonded isocyanate groups having an average NCO-functionality of 2.2 to 5.0 and a viscosity at 23° C. of 50 to 1500 mPa.s.

The coating compositions according to the invention generally contain, based on solids, 50 to 95, preferably 65 to 90% by weight of component A) in combination with 5 to 50, preferably 10 to 35% by weight of cross-linking agent B). The solids content of the coating compositions is generally 35 to 70% by weight.

The coating compositions according to the invention may the known additives of coatings technology. These include defoaming agents, thickeners, levelling agents, pigments, flatting agents, dispersants for pigment distribution and the like.

The coating compositions according to the invention which contain melamine resins or blocked polyisocyanates as cross-linking resins are one-component systems which are storage stable at room temperature and curable an elevated temperatures. Corresponding compositions containing polyisocyanates having free isocyanate groups as the cross-linking agent are two-component systems, which are obtained by mixing the individual components and which have only a limited pot-life at room temperature.

The preferred fields of application for the polyester-polyurethane dispersions according to the invention include their use thereof as binder components in flexible lacquer, coating and sealing compositions, particularly for the production of soft feel coatings, for example, for coating plastics and the interiors of automobiles. The polyester-polyurethane dispersions according to the invention are also suitable as binder components for aqueous coating compositions for plastics, films, metal, wood or mineral substrates.

In the following examples all parts and percentages are based on weight unless otherwise indicated. The pH values were determined according to DIN 53785 after dilution with distilled water to a solids content of 10% by weight.

EXAMPLES

Examples 1 to 11:

Preparation of polyester-polyurethane dispersions 1 to 11

Example 1 a) 514 g of ethylene glycol, 865 g of butanediol-1,4, 555 g of diethylene glycol and 2741 g of adipic acid were introduced into a 5 l reaction vessel equipped with a stirrer, cooler, heater and water separator and heated slowly to 220° C. under a stream of nitrogen. The overhead temperature was not allowed to exceed 102° C. Condensation with elimination of water was continued until the polyester had a total acid number of 3.0. At that time the OH number was 95.

b) 815 g of polyester 1a), 815 g of a liquid, difunctional, aliphatic polycarbonate having a hydroxyl group content of about 1.7% (Desmophen C 200, Bayer AG), 70 g of trimethylolpropane (TMP), 80 g of dimethylolpropionic acid (DMPA), 2.5 g of tin(II) octoate and 83 g of N-methylpyrrolidone (NMP) were introduced under nitrogen into a 5 l reaction vessel equipped with a stirrer, cooler and heater, heated to 130° C. and homogenized. The mixture was cooled to 100° C., 220 g of hexamethylene diisocyanate (HDI) was added and stirring was continued at 120° C. until NCO groups were no longer detectable. After cooling the reaction mixture to 90° to 100° C., 44.2 g of dimethylethanol-amine (DMEA) and 1770 g of water were added with stirring. The resulting polyester-polyurethane dispersion 1) had a solids content of 50.5%, an acid number of approx. 18 (100% solids), a pH of approx. 7.2, a degree of neutralization of approx. 90%, a hydroxyl group content of approx. 2.0% (100% solids) and a content of organic solvents of approx. 2.1%.

Example 2 a) 1939 g of adipic acid, 827 g of a hydrogenated dimeric fatty acid having an acid number of about 195 mg KOH/g, (Pripol 1025, Unichema), 366 g of ethylene glycol, 930 g of butanediol-1,4 and 469 g of diethylene glycol were introduced into a 5 l reaction vessel equipped with a stirrer, cooler, heater and water separator and heated slowly to 220° C. under a stream of nitrogen. Condensation with elimination of water was continued until the polyester had a total acid number of 4.5. At that time the OH number was 156.

b) 607.5 g of polyester 2a), 200 g of the difunctional polycarbonate from Example 1b), 40 g of DMPA, 20 g of TMP, 1.3 g of tin(II) octoate and 41.7 g of NMP were introduced under nitrogen into a 2 l reaction vessel equipped with a stirrer, cooler and heater, heated to 130° C. and homogenized. The mixture was cooled to 100° C., 132.5 g of HDI was added and stirring was continued under nitrogen until NCO groups were no longer detectable. After cooling the reaction mixture to approx. 90° C., 27 g of DMEA and 935 g of water were added with stirring. The resulting polyester-polyurethane dispersion 2) had a solids content of 47.6%, an acid number of approx. 19 (100% solids), a pH value of approx. 7.9, a degree of neutralization of 110%, a hydroxyl group content of approx. 2.2% (100% solids) and a content of organic solvents of approx. 2.1%.

Example 3

855 g of polyester 1a), 55 g of a difunctional, crystalline poly-1,6-hexanediol carbonate having an OH number of 56, 10 g of glycerol, 40 g of DMPA, 1.3 g of tin(II) octoate and 41.7 g of NMP were introduced under nitrogen into a 2 l reaction vessel equipped with a stirrer, cooler and heater, and homogenized at 130° C. After cooling the reaction mixture to 100° C., 108 g of HDI was added all at once and stirring was continued until NCO groups were no longer detectable. After cooling the reaction mixture to 90° C., 22.1 g of DMEA and 885 g of water were added. The resulting polyester-polyurethane dispersion 3) had a solids content of 49.8%, an acid number of approx. 20 (100% solids), a pH value of approx. 7.2 (10%), a degree of neutralization of 90%, a hydroxyl group content of 1.3% (100% solids) and a content of organic solvents of approx. 2.1%.

Example 4 a) 431 g of phthalic anhydride (PA), 1703 g of adipic acid, 1720 g of hexanediol-1,6 and 618 g of diethylene glycol were introduced in a 5 l reaction vessel equipped with a stirrer, cooler, heater and water separator and heated slowly to 220° C. under a stream of nitrogen. Condensation with elimination of water was continued until the polyester had a total acid number of 2.8. At that time the OH number was 161.

b) 393.7 g of polyester 4a), 393.8 g of the difunctional polycarbonate from Example 1b), 40 g of DMPA, 20 g of TMP, 1.3 g of tin(II) octoate and 41.7 g of NMP were introduced under nitrogen into a 2 l reaction vessel equipped with a stirrer, cooler and heater, heated to 130° C. and homogenized. After cooling the reaction mixture to 100° C., 152.5 g of hexamethylene diisocyanate was added and stirring was continued at 120° C. until NCO groups were no longer detectable. Cooling to 90° C. was then carried out and 17.2 g of DMEA and 985 g of water were added. The resulting polyester-polyurethane dispersion 4) had a solids content of 47.1%, an acid number of approx. 18 (100% solids), a degree of neutralization of 70%, a hydroxyl group content of approx. 1.2% (100% solids) and a content of organic solvents of approx. 2.0%.

Example 5 a) 530 g of ethylene glycol, 891 g of butanediol-1,4, 573 g of diethylene glycol and 2662 g of adipic acid were introduced into a 5 l reaction vessel equipped with a stirrer, cooler, heater and water separator and heated slowly to 220° C. under a stream of nitrogen. Condensation with elimination of water was continued until the polyester had a total acid number of 2.8. At that time the OH number was 147.

b) 570 g of polyester 5a), 200 g of a dimeric fatty alcohol having a hydroxyl number of about 200 mg KOH/g (Pripol 2033, Unichema), 40 g of DMPA, 20 g of TMP, 1.3 g of tin(II) octoate and 41.7 g of NMP were introduced under nitrogen into a 2 l reaction vessel equipped with a stirrer, cooler and heater, heated to 130° C. and homogenized. After cooling the reaction mixture to 100° C., a mixture of 130 g of HDI and 40 g of isophorone diisocyanate was added all at once and stirring was continued at 120° C. until NCO groups were no longer detectable. After cooling the reaction mixture to 90° C., 24.8 g of DMEA, 20 g of butyl glycol and 960 g of water were added. The resulting polyester-polyurethane dispersion 5) had a solids content of 45.9%, an acid number of approx. 20 (100% solids), a pH value of approx. 7.8, a degree of neutralization of approx. 100%, a hydroxyl group content of approx. 2.3% (100% solids) and a content of organic solvents of approx. 3.0%.

Example 6 a) 598 g of isophthalic acid, 1590 g of adipic acid, 1013 g of the dimeric fatty alcohol from Example 5b), 50 g of the dimeric fatty alcohol from Example 2a), 420 g of diethylene glycol and 894 g of ethylene glycol were introduced into a 5 l reaction vessel equipped with a stirrer, cooler, heater and water separator and heated slowly to 220° C. under a stream of nitrogen. Condensation with elimination of water was continued until the polyester had a total acid number of 2.6. At this time the OH number was 148.

b) 590 g of the polyester 6a), 200 g of the difunctional polycarbonate from Example 1b), 40 g of DMPA, 20 g of TMP, 1.3 g of tin(II) octoate and 41.7 g of NMP were introduced under nitrogen into a 2 l reaction vessel equipped with a stirrer, cooler and heater, heated to 130° C. and homogenized. After cooling the reaction mixture to 100° C., 150 g of HDI was added and stirring was continued at 120° C. until NCO groups were no longer detectable. After cooling the reaction mixture to 90° C., 24.4 g of DMEA and 985 g of water were added. The resulting polyester-polyurethane dispersion 6) had a solids content of 45.9%, an acid number of approx. 20 (100% solids), a pH value of approx. 7.8, a degree of neutralization of approx. 100%, a hydroxyl group content of approx. 1.7% (100% solids) and a content of organic solvents of approx. 1.9%.

Example 7 a) 531 g of ethylene glycol, 709 g of butanediol-1,4, 573 g of diethylene glycol, 2663 g of adipic acid and 181 g of TMP were introduced into a 5 l reaction vessel equipped with a stirrer, cooler, heater and water separator and heated slowly to 220° C. under a stream of nitrogen. Condensation with elimination of water was continued until the polyester had a total acid number of 3.3. At this time the OH number was 149.

b) 597.5 g of polyester 7a), 200 g of the difunctional polycarbonate from Example 1b), 40 g of DMPA, 20 g of TMP, 1.3 g of tin(II) octoate and 41.7 g of NMP were introduced under nitrogen into a 2 l reaction vessel equipped with a stirrer, cooler and heater, heated to 130° C. and homogenized. After cooling the reaction mixture to 100° C., 142.5 g of HDI was added and the reaction mixture was heated to 120° C. and stirred until NCO groups were no longer detectable. After cooling the reaction mixture to 90° C., 17.2 g of DMEA and 820 g of water were added. The resulting polyester-polyurethane dispersion 7) had a solids content of 52.0%, an acid number of approx. 20 (100% solids), a pH value of approx. 6.7, a degree of neutralization of approx. 70%, a hydroxyl group content of approx. 1.9% (100% solids) and a content of organic solvents of approx. 2.0%.

Example 8 a) 343 g of diethylene glycol, 1443 g of adipic acid, 907 g of the dimeric fatty alcohol from Example 2a) and 1721 g of hexanediol were introduced into a 5 l reaction vessel equipped with a stirrer, cooler, heater and water separator and heated slowly to 220° C. under a stream of nitrogen. Condensation with elimination of water was continued until the polyester had a total acid number of 2.6. At this time the OH number was 181.

b) 590 g of the polyester 8a), 200 g of the difunctional polycarbonate from Example 1b), 40 g of DMPA, 20 g of TMP, 1.3 g of tin(II) octoate and 41.7 g of NMP were introduced under nitrogen into a 2 l reaction vessel equipped with a stirrer, cooler and heater, heated to 130° C. and homogenized. After cooling the reaction mixture to 100° C., 150 g of HDI was added and stirring was continued at 120° C. until NCO groups were no longer detectable. After cooling the reaction mixture to 90° C., 18.2 g of dimethyl-isopropanolamine and 885 g of water were added. The resulting polyester-polyurethane dispersion 8) had a solids content of 49.2%, an acid number of approx. 19 (100% solids), a degree of neutralization of approx. 70%, a pH value of approx. 7.2, a hydroxyl group content of approx. 2.3% (100% solids) and a content of organic solvents of approx. 2%.

Example 9 a) 308 g of ethylene glycol, 922 g of butanediol, 395 g of diethylene glycol, 1427 g of adipic acid and 1390 g of the dimeric fatty alcohol from Example 2a) were introduced into a 5 l reaction vessel equipped with a stirrer, cooler, heater and water separator and heated slowly to 220° C. under a stream of nitrogen. Condensation with elimination of water was continued until the total acid number was 5. At this time the OH number was 180.

b) 585 g of polyester 9a), 100 g of a difunctional polyether having an OH number of 56 (Polyether 3600 Z, Bayer AG), 60 g of a difunctional diester based on a dimeric fatty acid and ethylene glycol and having an OH number of approx. 115 (Priplast 3193, Unichema), 30 g of a branched polyether having an OH number of 550 (Desmophen V 531, Bayer AG), 55 g of DMPA, 1.3 g of tin(II) octoate and 41.7 g of NMP were introduced under nitrogen into a 2 l reaction vessel equipped with a stirrer, cooler and heater, heated to 120° C. and homogenized. After cooling the reaction mixture to 100° C., 185 g of HDI was added and stirring was continued until NCO groups were no longer detectable. After cooling the reaction mixture to 90° C., 37.2 g DMEA and 885 g of water were added. The resulting polyester-polyurethane dispersion 9) had a solids content of 49.8%, an acid number of approx. 26 (100% solids), a degree of neutralization of approx. 100%, a pH value of approx. 8.0, a hydroxyl group content of approx. 1.9% (100% solids) and a content of organic solvents of approx. 2.0%.

Example 10

520 g of polyester 5a), 200 g of the difunctional polycarbonate from Example 1b), 50 g of DMPA, 40 g of TMP, 1.3 g of tin(II) octoate and 4.17 g of NMP were introduced under nitrogen into a 2 l reaction vessel equipped with a stirrer, cooler and heater, heated to 130° C. and homogenized. The reaction mixture was then cooled to 100° C., 190 g of hexamethylene diisocyanate was added and stirring was continued at 130° C. until NCO groups were no longer detectable. After cooling the reaction mixture to 90° C., 21.5 g of dimethylethanolamine and 935 g of water were added. The resulting polyester-polyurethane dispersion 10) had a solids content of 48.5%, an acid number of approx. 24 (100% solids), a pH value of approx. 7.1, a degree of neutralization of 70%, a hydroxyl group content of approx. 1.4% (100% solids) and a content of organic solvents of approx. 2.0%.

Example 11

620 g of polyester 5a), 200 g of the difunctional polycarbonate from Example 1b), 40 g of DMPA, 20 g of TMP, 1.3 g of tin(II) octoate and 4.17 g of NMP were introduced under nitrogen into a 2 l reaction vessel equipped with a stirrer, cooler and heater, heated to 130° C. and homogenized. The reaction mixture was then cooled to 100° C., 100 g of HDI and 20 g of a commercially available HDI trimer (Desmodur N 3300, Bayer AG) were added and stirring was continued at 130° C. until NCO groups were no longer detectable. After cooling the reaction mixture to 90° C., 24.6 g of DMEA and 885 g of water were added. The resulting polyester-polyurethane dispersion 11) had a solids content of 49.4%, an acid number of approx. 20 (100% solids), a pH value of 7.8, a degree of neutralization of approx. 100%, a hydroxyl group content of approx. 2.5% (100% solids) and a content of organic solvents of approx. 2%.

APPLICATION EXAMPLES

Starting materials:

Cross-linking agent 1

The trimer of 1,6-diisocyanatohexane, containing isocyanate groups and rendered hydrophilic, 80% in methoxypropyl acetate, NCO equivalent weight of the solution—305 (Bayhydur-VP LS 2032, Bayer AG).

Cross-linking agent 2

An amine cross-linking resin (Cymel 327, American Cyanamid), as supplied.

Cross-linking agent 3

Blocked aqueous polyisocyanate cross-linking agent (Bayhydur-VP 2050, Bayer AG), as supplied.

PUR-dispersion 1

An aliphatic, anionic PUR dispersion, rendered hydrophilic, solids content—40%, prepared in accordance with DE-OS 2,651,506 (U.S. Pat. No. 4,236,264).

Commercially available flatting agents
Silitin Z 86 (Hoffmann & Söhne KG, Neuburg)
Pergopak M 3 (Martinswerk, Bergheim)
Commercially available fillers
Talc
Special black IV (a commercial carbon black of Degussa AG, Germany)

Commercially available pigments
Bayferrox 318 M (Bayer AG)
Bayertitan R-KB 4 (Bayer AG)
Commercially available defoaming agent
Defoaming agent DNE (Bayer AG)
Commercially available wetting agent
Tego Wet KL 245 (Supplier: Tego-Chemie)

Application Example 1

191.1 g of polyester-polyurethane dispersion 1), 471.7 g of PUR dispersion 1), 2.1 g of defoaming agent DNE, 3.4 g of Tego Wet KL 245 wetting agent, 33.4 g of Silitin Z 86 flatting agent, 50.2 g of Pergopak M 3 flatting agent, 133.6 g of Bayferrox 318 M pigment and 46.2 g of distilled water were ground together. 68.3 g of cross-linking agent 1) was then added. The NCO:OH equivalent ratio was 1.5:1. A composition having a pot life of approx. 5 hours was obtained. The coating composition was applied to glass plates and plastics at approx. 55% relative humidity and 23° C. and then cured for 10 minutes at room temperature and 45 minutes at 80° C. The thickness of the dry film was approx. 50 μm.

The coating properties were tested after aging the films for 48 h at room temperature. The following properties were obtained:

| | |
|---|---|
| Visual appearance of film[1] | OK |
| Pendulum hardness (DIN 53157) | 43 sec. |
| Soft feel effect (0–5)[2] | 1–2 |
| Bonding to Bayblend[6] plastic | |
| cross cutting (DIN 53230)(0–5)[3] | 1–2 |
| cross cut (0–5)[3] | 1 |
| Partial solution (0–5)[4] | |
| super grade petrol | 1 |
| methoxypropyl acetate | 1 |
| xylene | 4 |
| ethanol | 0 |
| water | 0 |
| Crockmeter test[5] | 100 strokes no effect |

[1]Assessment of film homogeneity, uniformity of degree of dulling, wetting by pigment
[2]Value 0 = very good soft feel effect, Value 2 = good soft feel effect, Value 5 = no soft feel effect.
[3]Value 0 = excellent bonding, Value 2 = good bonding, Value 5 = very poor bonding.
[4]The partial solution was performed for a duration of 1 minute using a wad of cotton containing solvent.
Value 0 = no effect, Value 5 = detached.
[5]Rubbing test using a pad soaked in ethanol.
[6]Polycarbonate/ABS blend.

Application Example 2

276.6 g of polyester-polyurethane dispersion 11), 341.3 g of PUR dispersion 1), 2.2 g of defoaming agent DNE, 3.5 g of Tego Wet KL 245 wetting agent, 34.7 g of Silitin Z 86 flatting agent, 52.2 g of Pergopak M 3 flatting agent, 138.7 g of Bayferrox 318 M pigment and 51.9 g of distilled water were ground together and subsequently mixed with 98.9 g of cross-linking agent 1). The NCO:OH equivalent ratio was 1.5:1.

After application and curing as described in Application Example 1, the following test results were obtained:

| | |
|---|---|
| Visual appearance of film | OK |
| Pendulum hardness (DIN 53157) | 49 sec. |
| Soft feel effect | 2 |
| Bonding to Bayblend plastic | |
| cross cutting (DIN 53230) | 2 |
| cross cut | 1 |
| Partial solution | |
| super grade petrol | 1 |
| methoxypropyl acetate | 1 |
| xylene | 2 |
| ethanol | 0 |
| water | 0 |
| Crockmeter test | 100 strokes no effect |

Application Examples 3 to 11

Coating compositions were prepared following the procedure of set forth in Application Example 2 by mixing the polyester-polyurethane (PES-PUR) dispersions set forth in the following table with PUR dispersion 1), the additives used in Application Example 2 and cross-linking agent 1). The amounts of the individual components (based on solids) correspond to the amounts used in Application Example 2. The following results were obtained:

| Application Example | PES-PUR dispersion | Soft feel effect | Bonding cross cutting | Resistance to solvent* |
|---|---|---|---|---|
| 3 | 3 | 2 | 2 | 1/2/1/3/0 |
| 4 | 1 | 2 | 1–2 | 1/1/1/0/0 |
| 5 | 2 | 2 | 2 | 2/1/1/0/0 |
| 6 | 4 | 2 | 2 | 2/1/1/1/0 |
| 7 | 5 | 1–2 | 3 | 1/1/1/0/0 |
| 8 | 6 | 3 | 2–3 | 1/1/1/1/0 |
| 9 | 7 | 2–3 | 2 | 2/1/1/0/0 |
| 10 | 8 | 2–3 | 2 | 1/2/2/1/0 |
| 11 | 9 | 3 | 3 | 2/1/2/1/0 |

*Values for super grade petrol, methoxypropyl acetate, xylene, ethanol, water.

Application Example 12

351 g of polyester-polyurethane dispersion 1), 228 g of PUR dispersion 1), 2 g of defoaming agent DNE, 3 g of Tego Wet KL 245 wetting agent, 35 g of Silitin Z 86 flatting agent, 52 g of Pergopak M 3 flatting agent, 140 g of Bayferrox 318 M pigment and 87 g of distilled water were ground together and then homogeneously mixed with 102 g of cross-linking agent 1). The NCO/OH equivalent ratio was 1.5:1. The combination of binders was applied and cured as described in Application Example 1.

| | |
|---|---|
| Visual appearance of film | OK |
| Pendulum hardness (DIN 53157) | 43 sec. |
| Bonding to Bayblend plastic | |
| cross cutting (DIN 53230) | 1 |
| cross cut | 1–2 |
| Bonding to Bayflex (PUR-RIM) plastic | |
| cross cutting | 1 |
| cross cut | 1–2 |
| Partial solution | |
| super grade petrol | 1–2 |
| methoxypropyl acetate | 1 |
| xylene | 0–1 |
| ethanol | 0 |
| water | 0 |
| Crockmeter test | 80 strokes no effect |

Application Example 13 a) 150 g of polyester-polyurethane dispersion 10) and 141 g of cross-linking agent 3) were mixed, adjusted by means of water to a viscosity of approx. 30 sec. (DIN 4 mm viscosity cup), applied to glass plates and steel sheets at room temperature and after exhaustion of air for 10 minutes at room temperature were cured for 30 minutes at 160° C. A clear, cross-linked film was obtained (dry film thickness approx. 45 μm) having very high elasticity (Erichsen test in accordance with DIN 53156>10 mm) and good resistance to solvents (methyl ethyl ketone rub test: 200 strokes without effect).

b) 150 g of polyester-polyurethane dispersion 10) and 26 g of cross-linking agent 2) were mixed, adjusted by means of water to a viscosity of approx. 30 sec. (DIN 4 mm viscosity cup) and applied and cured as described above. A clear film was obtained having very high elasticity (Erichsen test> 10 mm) and good resistance to solvents (methyl ethyl ketone rub test: 200 strokes without effect).

Application Example 14

342 g of polyester-polyurethane dispersion 1), 2 g of defoaming agent DNE, 3 g of Bayertitan R-KB 4 pigment, 104 g of talc AT 1,209 g of Special black IV and 241 g of distilled water were ground together and then homogeneously mixed with 99 g of cross-linking agent 1). The resulting aqueous two-component priming coat was as in Application Example 2.

Although the invention had been described in detail in the foregoing for the purpose of illustration, it was to be understood that such detail was solely for that purpose and that variations can be made therein by those skilled in the art without departing from the spirit and scope of the invention except as it may be limited by the claims.

What is claimed is:

1. An aqueous dispersion of polyester-polyurethanes having an acid number of 5 to 60 mg KOH/g, a hydroxyl group content of 0.25 to 6.5% by weight and a urethane group content (calculated as —NH—CO—O—) of 2 to 25% by weight, wherein these ranges are based on polyester-polyurethane solids and wherein the polyester-polyurethanes are reaction products, optionally at least partly neutralized by bases, of a) 15 to 90% by weight of one or more essentially linear, polyester polyols having a molecular weight of 500 to 4000, other than those which satisfy the requirements of component b), in which the polyester polyols are reaction products of a1) 30 to 65% by weight of an acid component selected from the group consisting of adipic acid, sebacic acid, azelaic acid, hydrogenated dimeric fatty acids and mixtures thereof, a2) 20 to 65% by weight of a diol component selected from the group consisting of ethylene glycol, 1,2- and 1,3-propanediol, 1,3- and 1,4 -butanediol, 1,6- hexanediol, diethylene glycol, dipropylene glycol, neopentyl glycol and mixtures thereof and a3) 0 to 15% by weight of an acid component selected from the group consisting of phthalic anhydride, isophthalic acid, hexahydrophthalic anhydride, 1,4-cyclohexanedicarboxylic acid, dimeric fatty acids containing high proportions of trimeric fatty acids, hydrogenated fatty acids, isononanoic acid, 2-ethylhexanoic acid and mixtures thereof and a4) 0 to 7% by weight of a triol component selected from the group consisting of trimethylolpropane, glycerol and mixtures thereof, wherein the sum of the percentages of components a1) to a4) is 100, b) 4 to 75% by weight of one or more essentially difunctional polyols selected from i) polycarbonates having a molecular weight of 400 to 6000 and ii) dimeric fatty alcohols obtained by the hydrogenation of the carboxyl groups of dimeric fatty acids to hydroxyl groups, the alkoxylation of the carboxyl groups of dimeric fatty acids or the esterification of the carboxyl groups of dimeric fatty acids using low molecular weight diols, c) 1 to 10% by weight of one or more acidic components selected from i) hydroxycarboxylic acids, ii) amino acids, iii) aminosulphonic acids and iv) alkali salts of the acids of i), ii) and iii), d) 0 to 20% by weight of a low molecular weight component selected from compounds which have a molecular weight of 60 to 300 and contain at least two hydroxyl and/or amino groups, e) 0 to 20% by weight of one or more hydrophilic monovalent or divalent alcohols which have a molecular weight of 350 to 3000 and contain lateral and/or terminal ethylene oxide units and f) 5 to 50% by weight of a polyisocyanate component selected from organic polyisocyanates having a molecular weight of 168 to 1000, provided that at least 50% by weight of the polyisocyanate component is selected from linear aliphatic diisocyanates having a molecular weight of 168 to 300, wherein the sum of the percentages of components a) to f) is 100.

2. The aqueous dispersion of claim 1 wherein component b) contains a linear polycarbonate diol having a molecular weight of 750 to 4000, component c) contains at least 85% by weight of 2,2-dimethylolpropionic acid and/or 2,2-dimethylolbutyric acid, component d) contains at least one low molecular weight diol or triol having a molecular weight of 90 to 150 and component e) contains at least 75% by weight of linear aliphatic diisocyanates having a molecular weight of 168 to 300.

3. The aqueous dispersion of claim 1 wherein the dispersed polyester-polyurethanes have an acid number of 8 to 40 mg KOH/g, a hydroxyl group content of 0.5 to 3.5% by weight and a urethane group content of 4 to 19% by weight, and are reaction products of 27 to 70% by weight of component a), 10 to 60% by weight of component b), 2 to 7% by weight of component c), 0.5 to 10% by weight of component d), 0 to 10% by weight of component e) and 7 to 30% by weight of component f), wherein the sum of the percentages of components a) to 0 is 100.

4. The aqueous dispersion of claim 2 wherein the dispersed polyester-polyurethanes have an acid number of 8 to 40 mg KOH/g, a hydroxyl group content of 0.5 to 3.5% by weight and a urethane group content of 4 to 19% by weight, and are reaction products of 27 to 70% by weight of component a), 10 to 60% by weight of component b), 2 to 7% by weight of component c), 0.5 to 10% by weight of component d), 0 to 10% by weight of component e) and 7 to 30% by weight of component f), wherein the sum of the percentages of components a) to f) is 100.

5. The aqueous dispersion of claim 1 wherein i) component b) comprises a linear polycarbonate diol having a molecular weight of 7 50 to 4000, ii) component c) comprises at least 85% by weight, based on the weight of component c), of 2,2-dimethylolpropionic acid and/or 2,2 -dimetholbutyric acid, iii) component d) comprises one or more low molecular weight diol or triols having a molecular weight of 90 to 150 and iv) component e) comprises at least 75%, based on the weight of component e), of said linear aliphatic diisocyanates.

6. The aqueous dispersion of claim 2 wherein i) component b) comprises a linear polycarbonate diol having a molecular weight of 750 to 4000, ii) component c) comprises at least 85% by weight, based on the weight of component c), of 2,2-dimethylolpropionic acid and/or 2,2 dimetholbutyric acid, iii) component d) comprises one or more low molecular weight diol or triols having a molecular weight of 90 to 150 and iv) component e) comprises at least 75%, based on the weight of component e), of said linear aliphatic diisocyanates.

7. The aqueous dispersion of claim 3 wherein i) component b) comprises a linear polycarbonate diol having a molecular weight of 750 to 4000, ii) component c) comprises at least 85% by weight, based on the weight of component c), of 2,2-dimethylolpropionic acid and/or 2,2 -dimetholbutyric acid, iii) component d) comprises one or more low molecular weight diol or triols having a molecular weight of 90 to 150 and iv) component e) comprises at least 75%, based on the weight of component e), of said linear aliphatic diisocyanates.

8. The aqueous dispersion of claim 4 wherein i) component b) comprises a linear polycarbonate diol having a molecular weight of 750 to 4000, ii) component c) comprises at least 85% by weight, based on the weight of component c), of 2,2-dimethylolpropionic acid and/or 2,2 -dimetholbutyric acid, iii) component d) comprises one or more low molecular weight diol or triols having a molecular weight of 90 to 150 and iv) component e) comprises at least 75%, based on the weight of component e), of said linear aliphatic diisocyanates.

9. An aqueous coating composition containing as binder
A) a polyol component containing 25 to 100% by weight of a polyester-polyurethane of claim 1 and 0 to 75% by weight of other binders and
B) a cross-linking resin selected from amino resins, blocked polyisocyanates which may be hydrophilically modified and polyisocyanates containing free isocyanate groups which may be hydrophilically modified.

10. An aqueous coating composition containing as binder
A) a polyol component containing 25 to 80% by weight of the polyester-polyurethane of claim 1 and 20 to 75% by weight of an anionically and/or nonionically hydrophilically modified polyurethane resin which does not contain hydroxyl groups and has a weight average molecular weight of at least 15,000 and
B) a cross-linking resin selected from melamine resins, blocked polyisocyanates which may be hydrophilically modified and polyisocyanates containing free isocyanate groups which may be hydrophilically modified.

11. A coated substrate prepared from the coating composition of claim 9.

12. A coated substrate prepared from the coating composition of claim 10.

* * * * *